No. 801,972. PATENTED OCT. 17, 1905.
L. J. DAVIS.
BRACKET FOR POULTRY ROOSTS.
APPLICATION FILED FEB. 17, 1905.
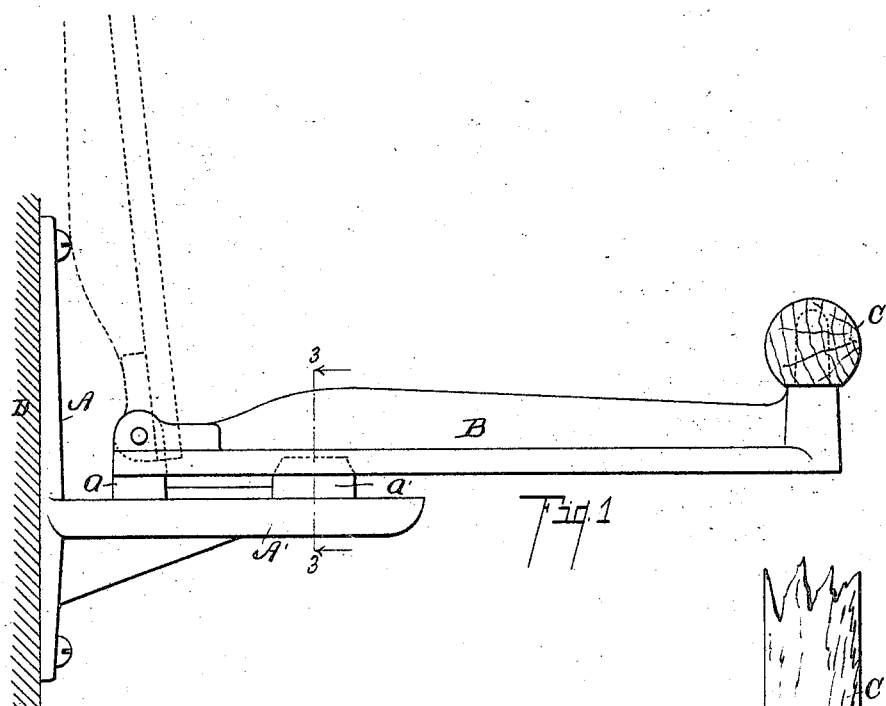
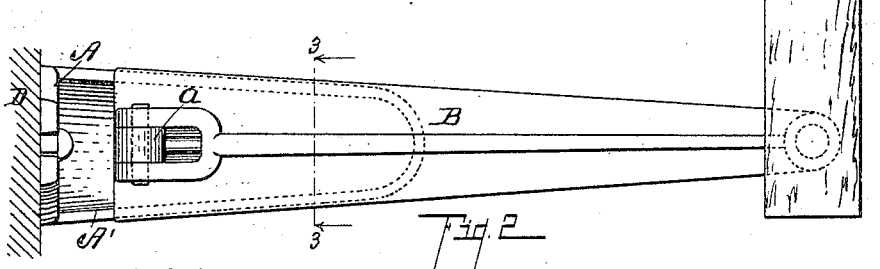
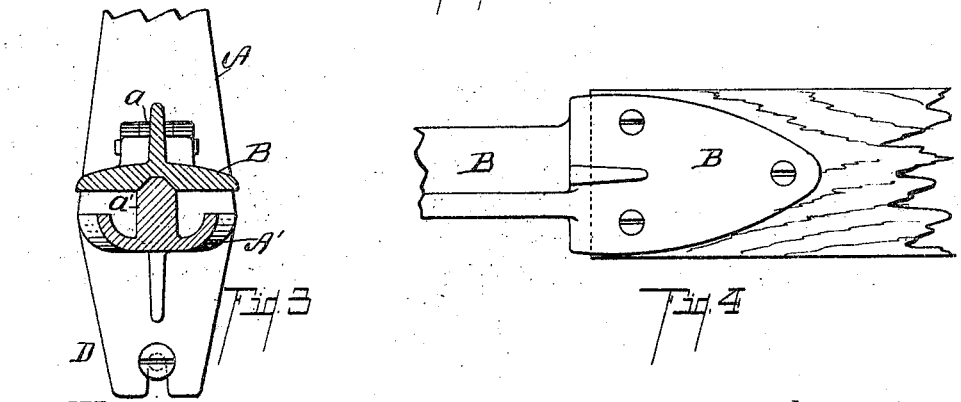
Witnesses:
Inventor,
Linford J. Davis
By Chappell & Earl
Att'y.s

UNITED STATES PATENT OFFICE.

LINFORD J. DAVIS, OF BATTLECREEK, MICHIGAN, ASSIGNOR TO THE KEYES-DAVIS CO., LTD., OF BATTLECREEK, MICHIGAN.

BRACKET FOR POULTRY-ROOSTS.

No. 801,972.     Specification of Letters Patent.     Patented Oct. 17, 1905.

Application filed February 17, 1905. Serial No. 246,133.

*To all whom it may concern:*

Be it known that I, LINFORD J. DAVIS, a citizen of the United States, residing at the city of Battlecreek, county of Calhoun, State of Michigan, have invented certain new and useful Improvements in Brackets for Poultry-Roosts, of which the following is a specification.

This invention relates to improvements in brackets for poultry-roosts.

The main object of this invention is to provide an improved bracket for poultry which serves as an effective insect or parasite trap or destroyer, preventing the insects from reaching the fowls.

Further objects and objects relating to structural details will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawings, forming a part of this specification, in which—

Figure 1 is a side elevation view of my improved bracket, the raised position of the arm B being indicated by dotted lines. Fig. 2 is a detail plan view of the structure appearing in Fig. 1. Fig. 3 is a transverse sectional view taken on a line corresponding to line 3 3 of Figs. 1 and 2 looking in the direction of the little arrows at the ends of the section-lines. Fig. 4 is a detail view of a modification of the arm B, the arm being provided with a shoe at its outer end, to which the frame is secured by suitable screws.

In the drawings the sectional view is taken looking in the direction of the little arrows at the ends of the section-line, and similar letters of reference refer to similar parts throughout the several views.

Referring to the drawings, the wall-plate A is provided with an outwardly-projecting arm A', having a trough therein. A post $a$ is located in this trough toward its inner end, and the bracket-arm B is pivoted to this post. A rest $a'$ for the arm is located toward the outer end of the trough, and the arm is provided with a seat adapted to engage the top of the post, so that the parts may be made comparatively light and at the same time be strong and rigid. The post $a$ and the rest $a'$ are located in the trough, so as to be entirely surrounded by the material with which the trough is filled to trap or destroy the insects, so that the bracket-arm is entirely inaccessible to insects from the wall or post to which the wall-plate is secured. The arm B is provided with a flange at its inner end of sufficient width to form a cover or shield for the trough when the arm is in its extended position.

When the arm is turned up, as indicated by dotted lines, the trough is readily accessible for cleaning or renewing the supply of insect trapping or destroying material.

In the modified structure (shown in Fig. 4) the end of the arm is provided with a shoe B'. This modified structure is of particular advantage where it is desired to support a frame having a pair of roosts thereon instead of a single roost, as illustrated herein. With the parts thus arranged the arm B is supported so that it is entirely inaccessible to the insects or parasites when the trough is supplied with the proper material to destroy or trap them.

As before stated, when the arm B is in its extended position it forms a shield or cover for the trough. The trough is, however, entirely accessible for the purpose of cleaning and the like when the arm is in its raised position, as indicated by dotted lines in Fig. 1.

The roosts are supported by my improved brackets so that they may be easily manipulated.

I have illustrated and described my improved bracket in detail in the form preferred by me. I am aware, however, that it may be varied considerably in structural details without departing from my invention.

Having thus described my invention, what I claim as new, and desire to secure by Letters Patent, is—

1. In a bracket, the combination of the wall-plate; a projecting arm thereon, having a trough therein; a post located in said trough toward its inner end; an arm pivotally secured to said post adapted to form a cover or shield for said trough; a rest for said arm, located in said trough toward its outer end; and a seat in said arm adapted to engage said rest, for the purpose specified.

2. In a bracket, the combination of the wall-plate; a projecting arm thereon, having a trough therein; a post located in said trough toward its inner end; an arm pivotally secured to said post adapted to form a cover or shield for said trough, and a rest for said arm located in said trough toward its outer end, for the purpose specified.

3. In a bracket, the combination of the wallplate; a projecting arm thereon, having a trough therein; a post located in said trough toward its inner end; and an arm pivotally secured to said post adapted to form a cover or shield for said trough, for the purpose specified.

4. In a bracket, the combination of the wallplate; a projecting arm thereon, having a trough therein; a post located in said trough toward its inner end; an arm pivotally secured to said post; a rest for said arm, located in said trough toward its outer end; and a seat in said arm adapted to engage said rest, for the purpose specified.

5. In a bracket, the combination of the wallplate; a projecting arm thereon, having a trough therein; a post located in said trough toward its inner end; an arm pivotally secured to said post; and a rest for said arm, located in said trough toward its outer end, for the purpose specified.

6. In a bracket, the combination of the wallplate; a projecting arm thereon, having a trough therein; a post located in said trough toward its inner end; and an arm pivotally secured to said post, for the purpose specified.

In witness whereof I have hereunto set my hand in the presence of two witnesses.

LINFORD J. DAVIS.

Witnesses:
E. MAE RICHTMYER,
WALTER W. FISHER.